May 18, 1948.  H. J. LOUNSBURY  2,441,640
WORM GEAR HOUSING
Filed Oct. 18, 1946  2 Sheets-Sheet 1

Inventor
Harvey J. Lounsbury
By Henry Fuchs
Atty.

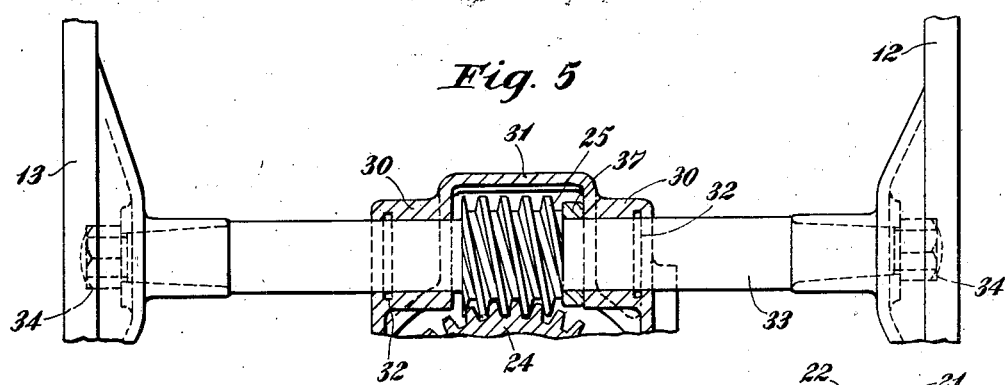
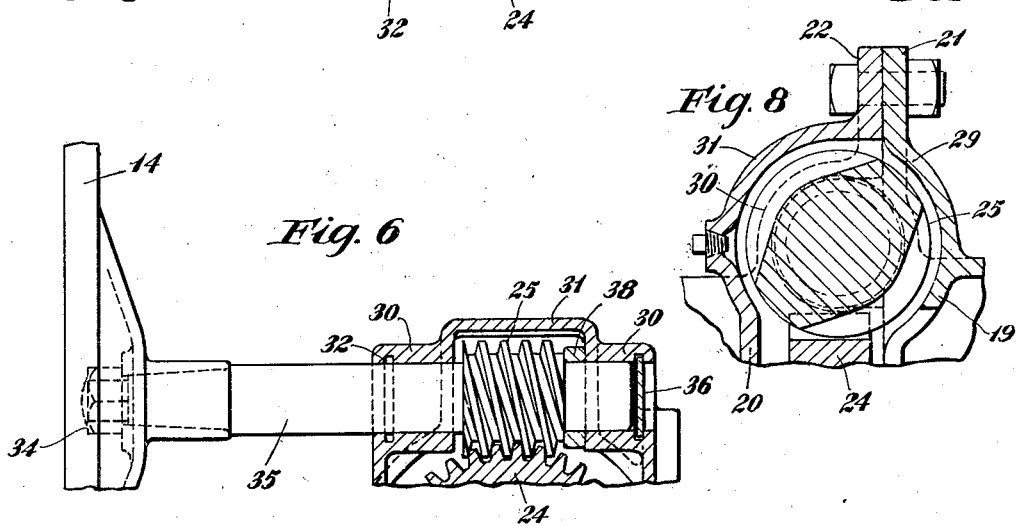
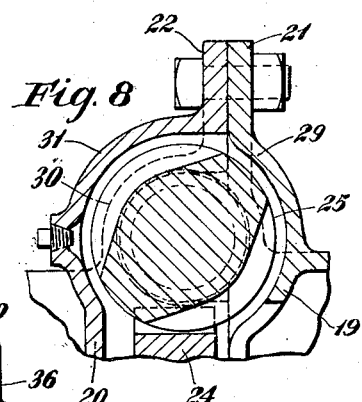
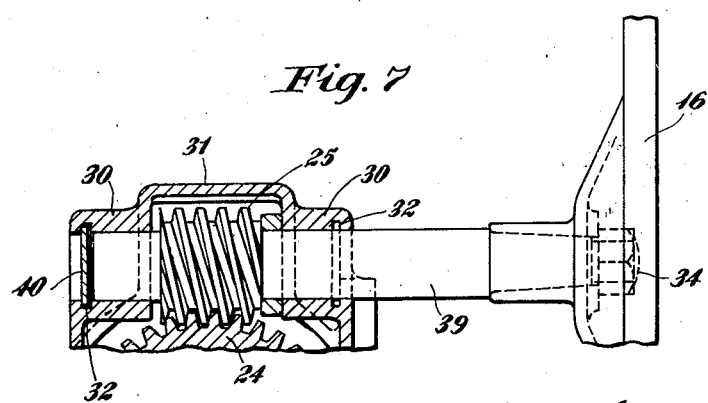

Patented May 18, 1948

2,441,640

UNITED STATES PATENT OFFICE 2,441,640

WORM GEAR HOUSING

Harvey J. Lounsbury, Glen Ellyn, Ill., assignor to W. H. Miner, Inc., Chicago, Ill., a corporation of Delaware Application October 18, 1946, Serial No. 704,192

4 Claims. (Cl. 74—606)

This invention relates to improvements in hand brakes for railway cars.

One object of the invention is to provide a hand brake mechanism of the power multiplying gear type enclosed within a housing adapted to be mounted on the wall member of a car and arranged to be actuated by a hand wheel operated shaft, wherein the parts are so designed that either a hand wheel operated shaft arranged for operation from the interior of the car or a hand wheel shaft arranged for operation from the exterior of the car, or a hand wheel shaft arranged for operation both from the exterior and interior of the car, may be employed.

A more specific object of the invention is to provide a mechanism as set forth in the preceding paragraph wherein the enclosing housing is provided with bearing means adapted to accommodate a shaft having a hand wheel at one end thereof, arranged for operation from the interior of the car, or a shaft having a hand wheel at one end thereof arranged for operation from the exterior of the car, or a shaft having hand wheels at both ends thereof to provide for operation both from the interior and exterior of the car.

Other objects of the invention will more clearly appear from the description and claims hereinafter following.

Figure 1:
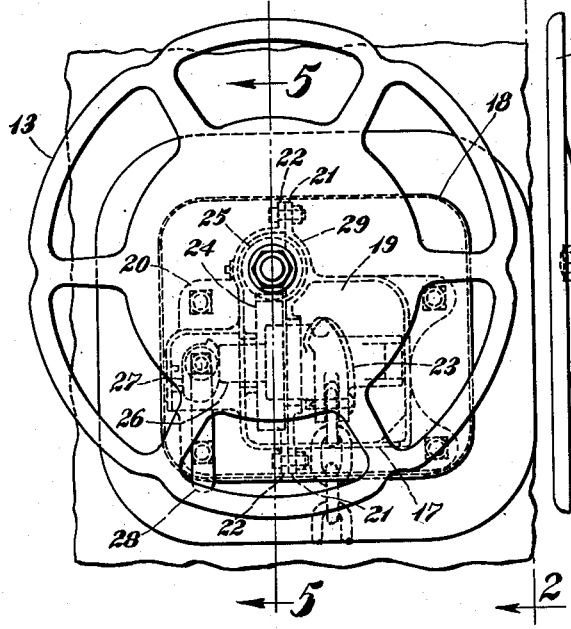
Figure 2:
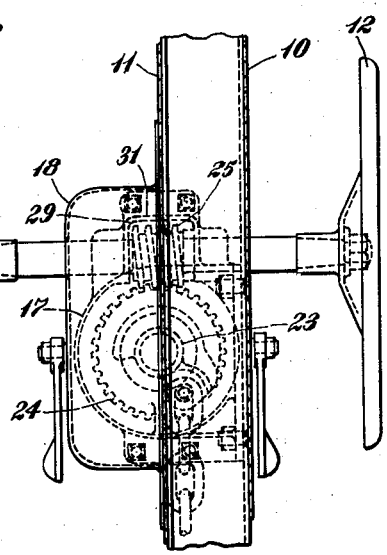
Figure 3:
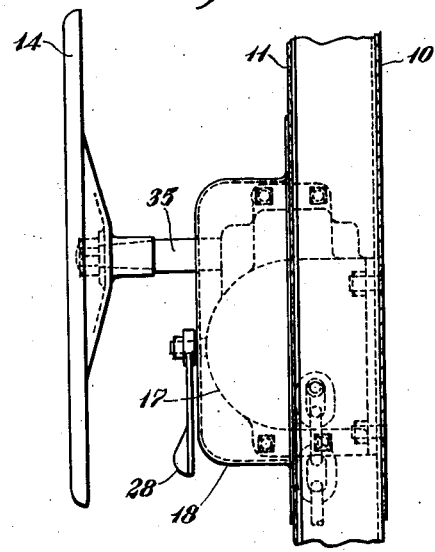
Figure 4:
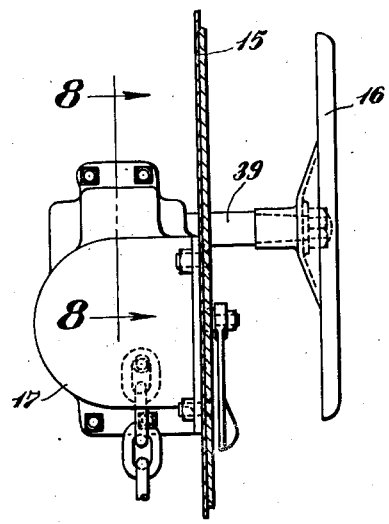

In the accompanying drawings forming a part of this specification, Figure 1 is an elevational view of my improved hand brake mechanism, illustrating the same applied to the end wall of a railway car, looking toward the right in Figure 2, and showing the mechanism arranged for operation from both the interior and exterior of the car. Figure 2 is a vertical sectional view, corresponding substantially to the line 2—2 of Figure 1. Figure 3 is a view, similar to Figure 2, showing the mechanism arranged for operation from the exterior of the car only. Figure 4 is a view similar to Figure 2, showing the mechanism arranged for operation from the interior of the car only. Figure 5 is a transverse, vertical sectional view, on an enlarged scale, partly broken away, corresponding substantially to the line 5—5 of Figure 1. Figure 6 is a view, similar to Figure 5, showing the mechanism arranged for operation as illustrated in Figure 3. Figure 7 is a view, similar to Figure 5, showing the mechanism arranged for operation as illustrated in Figure 4. Figure 8 is a vertical sectional view, on an enlarged scale, corresponding substantially to the line 8—8 of Figure 4.

In said drawings, referring first to Figures 1, 2, and 3, 10 and 11 designate the inner and outer members of the vertical end wall of a railway car. Figures 1 and 2 illustrate the improved hand brake mechanism arranged to be operable from both the interior and exterior of the car by means of the usual hand wheels, which are indicated by 12 and 13, respectively. Figure 3 illustrates the improved mechanism arranged for operation from the exterior of the car only, the same being provided with a single hand wheel 14 at the outer side of the end wall of the car. In Figure 4, my improved hand brake mechanism is shown as operated from the interior of a car, the same being illustrated as mounted on the end wall of the car which is in the form of a single wall member 15, the hand wheel by which it is operated being indicated by 16.

The operative parts of the mechanism are preferably enclosed in a housing 17, as shown in Figures 1, 2, 3, and 4, the wall member 11 being cut out or recessed, as shown in Figures 1, 2, and 3 to accommodate the same, and the opening being closed by a cover in the form of a hood 18 engaged over the projecting portion of the housing and suitably secured to the wall member 11 by any well-known fastening means. As shown in Figure 4, wherein the brake mechanism is applied to a car having an end wall comprising the single wall member 15 and the housing 17 which is directly secured to said wall, no covering hood is employed.

In carrying out my invention, the housing 17 is formed of two parts, 19 and 20, to provide for ready assembling of the brake mechanism, the housing being vertically divided, as shown in Figure 1. The parts or sections 19 and 20 of the housing together form a two-part chamber within which the parts of the brake mechanism are enclosed, the sections 19 and 20 being secured together by bolts or any other well-known fastening elements extending through outstanding flanges 21 and 22 on said sections.

The sectional housing 17 contains the mechanism for winding the usual brake chain, which mechanism is of the worm gear driven type of the character illustrated in my Patent No. 2,439,941 dated April 20, 1948. This worm gear driven winding mechanism comprises a rotatable chain winding drum 23 mounted for rotation about a horizontal axis, a worm wheel 24 co-axial with the drum, a worm 25 meshing with the worm wheel 24, a clutch 26 operatively connecting the worm wheel and drum, a clutch shifting cam member 27, and an operating lever 28 for the clutch. The worm 25 is located within the housing above the worm wheel 24 and is rotatable about a horizontal axis at right angles to the axis of rotation of the worm wheel and winding drum. The winding drum 23, worm wheel 24, clutch 26, cam member 27, and operating lever 28 are identical with the drum, worm wheel, clutch, cam, and cam operating lever of said copending application and are supported by the housing in the same manner.

The two part housing of my improved mechanism is provided with an upstanding section 29 above the worm wheel 24 which contains the worm 25. The section 29 is hollow to accommodate the worm and is divided vertically, being formed partly on each part 19 and 20 of the housing. The section 29 is open at the front and rear sides of the housing and presents cylindrical bearing sleeve portions 30—30 at opposite ends thereof, which are in axial alignment. Between the bearing sleeve portions 30—30, the section 29 is expanded or enlarged, as indicated at 31, to accommodate the worm 25. Near the outer end thereof, each bearing sleeve portion 30 has an interior, annular groove or channel 32 adapted to receive a suitable closure disc hereinafter described. As shown in Figures 1 and 8, the plane of vertical division of the section 29 is to one side of the axis of the bearing portions 30—30, the portion of the section formed on the part 20 being more than half of said section.

Referring to Figures 1, 2, and 5, wherein the hand brake mechanism is shown as arranged to be operated from both the interior and exterior of the car, the worm 25 is carried by a shaft 33, which is journaled in the bearing sleeves 30—30, the worm being located midway between the ends of the shaft and formed integral therewith. The shaft 33 has the hand wheels 12 and 13 fixed to opposite ends thereof in any well-known manner, the same being shown as secured by nuts 34—34 threaded on the ends of the shaft. A thrust washer or ring 37 is preferably interposed between the right hand bearing sleeve and the corresponding end of the worm 25, as seen in Figure 5.

In assembling the parts of the brake mechanism, the shaft 33 and its integral worm member 25, as shown in Figures 1, 2, and 5, are placed in position within the part of the section 29, which is on the housing part 20, before the two housing sections are secured together, the shaft 33 being passed in lateral direction into the sections of the bearing sleeves 30—30 which are located on the housing part 20. The housing sections are then secured together.

Referring to Figures 3 and 6, wherein the hand brake mechanism is shown as arranged to be operated from the exterior of the car only, the worm 25 is carried by a shaft 35 which is journaled in the bearing sleeves 30—30, the worm 25 being integral with the shaft and located near the inner or right hand end of the same, as seen in Figure 6. The shaft 35 extends entirely through the left hand bearing sleeve 30 but terminates short of the outer end of the right hand sleeve, having its end disposed inwardly of the groove or channel 32 of said sleeve. To prevent entrance of foreign matter, the opening at the outer end of the right hand sleeve 30 is preferably sealed by a closure member in the form of a disc 36 seated in the annular groove or channel 32. The shaft 35 carries the hand wheel 14 at its outer or left hand end, the hand wheel being suitably secured thereto to effect rotation of the worm 25 to drive the worm wheel 24. A thrust washer 38, similar to the washer 37 hereinbefore referred to, is preferably arranged between the right hand bearing sleeve 30 and the worm 25.

Referring to Figures 4 and 7, wherein the hand brake mechanism is shown as arranged to be operated from the interior of the car only, the worm 25 is carried by a shaft 39, which is journaled in the bearing sleeves 30—30, the worm 25 being integral with the shaft and near the inner or left hand end of said shaft, as seen in Figure 7. The shaft extends entirely through the right hand bearing sleeve 30, but terminates short of the outer end of the left hand sleeve, having its end disposed inwardly of the groove or channel 32 of said sleeve. The opening at the outer end of the left hand sleeve 30 is closed by a disc 40, identical with the disc 36 hereinbefore described, and seated in the groove or channel 32. The shaft 39 carries the hand wheel 16 at the outer or right hand end to which it is suitably secured to effect rotation of the worm 25.

The operation of assembling the parts shown in Figures 3 and 6 and the parts shown in Figures 4 and 7 is the same as that described in connection with the parts shown in Figures 1, 2, and 3.

I claim:

1. In a worm gear operated hand brake mechanism having a worm element meshing with a worm wheel and a hand wheel actuated shaft to which the worm element is fixed, the combination with a two piece split housing enclosing the hand brake mechanism, said housing including a split extension formed partly on each piece of the housing; of spaced, axially aligned, front and rear tubular bearing sleeve members carried by said split extension of the housing; a chamber between the inner ends of said front and rear bearing sleeves adapted to accommodate the worm element with the portions of the hand wheel operated shaft at opposite sides of said worm element journaled in said bearing sleeves respectively; an internal annular locking channel at the outer end of each bearing sleeve; and a closure disc adapted to be seated in either of said channels to seal the opening of the corresponding sleeve, said extension of the housing accommodating a hand wheel actuated shaft extending entirely through said bearing sleeves when said closure disc is omitted.

2. In a worm gear operated brake mechanism, the combination with a two part housing enclosing the brake mechanism; of an operating shaft having hand wheels at the front and rear ends thereof; a worm element forming a part of the worm gear of the mechanism, said element being fixed to said shaft midway between the ends thereof; and an extension on said housing comprising front and rear bearing sleeves and an enlarged chamber between said sleeves, said sleeves and chamber being split lengthwise into two sections, said sections being formed on the respective parts of the two part housing, said sections of the sleeves embracing said shaft with the worm element thereof disposed in said chamber, each of said bearing sleeves having an internal, annular groove at the outer end thereof forming a seat for a closure disc adapted to seal the end of the corresponding sleeve when an operating shaft having a hand wheel at one end thereof only is substituted for the operating shaft having hand wheels at the front and rear ends.

3. In a worm gear operated hand brake mechanism, the combination with a two part housing enclosing said mechanism; of an operating shaft having a hand wheel at the front end thereof; a worm element forming part of the worm gear of the mechanism, said element being fixed to the rear end portion of said shaft shaft in inwardly spaced relation to the rear end thereof; an extension on said housing comprising front and rear bearing sleeves and an enlarged chamber between said sleeves, said sleeves and chamber being split lengthwise into two sections, said sections being formed respectively on said two parts of the housing, said sections of the front sleeve embracing said shaft forwardly of said worm element, and said sections of the rear sleeve embracing the shaft rearwardly of said worm element, each of said bearing sleeves having an internal annular groove at the outer end thereof, said groove of said rear sleeve being beyond the rear end of the shaft; and a closure disc seated in said groove of the rear sleeve to seal the opening of the latter.

4. In a worm gear operated hand brake mechanism, the combination with a two part housing enclosing said mechanism; of an operating shaft having a hand wheel at the rear end thereof; a worm element forming part of the worm gear of the mechanism, said element being fixed to the front end portion of said shaft in inwardly spaced relation to the front end thereof; an extension on said housing comprising front and rear bearing sleeves and an enlarged chamber between said sleeves, said sleeves and chamber being split lengthwise into two sections, said sections being formed respectively on said two parts of the housing, said sections of the front sleeve embracing said shaft forwardly of said worm element, and said sections of the rear sleeve embracing the shaft rearwardly of said worm element, each of said bearing sleeves having an internal annular groove at the outer end thereof, said groove of said front sleeve being beyond the front end of the shaft; and a closure disc seated in said groove of the front sleeve to seal the opening of the latter.

HARVEY J. LOUNSBURY.

REFERENCES CITED

The following references are of record in the file of this patent:

UNITED STATES PATENTS

| Number | Name | Date |
|---|---|---|
| 1,865,630 | Haseltine | July 5, 1932 |
| 1,950,618 | Lounsbury | Mar. 13, 1934 |
| 2,082,964 | Lounsbury | June 8, 1937 |
| 2,121,095 | Olander | June 21, 1938 |